United States Patent
Nafziger

(10) Patent No.: US 6,546,706 B1
(45) Date of Patent: Apr. 15, 2003

(54) MOWER DECK AND TRIMMER COMBINATION

(76) Inventor: Dean Nafziger, 42 WillowWay, Archbold, OH (US) 43502

( * ) Notice: Subject to any disclaimer, the term of this patent is extended or adjusted under 35 U.S.C. 154(b) by 0 days.

(21) Appl. No.: 09/641,048

(22) Filed: Aug. 17, 2000

(51) Int. Cl.[7] ............................................... A01D 34/66
(52) U.S. Cl. .................... 56/13.7; 56/DIG. 22
(58) Field of Search .................. 56/10.4, 13.7, 56/12.7, 320.1, DIG. 22

(56) References Cited

U.S. PATENT DOCUMENTS

| | | | |
|---|---|---|---|
| 3,183,651 A | * 5/1965 | Hoefler | 56/10.4 |
| 4,104,851 A | * 8/1978 | Perry | 56/10.4 |
| 4,573,306 A | * 3/1986 | Smith et al. | 56/10.4 |
| 5,035,107 A | * 7/1991 | Scarborough | 56/10.4 |
| 5,396,754 A | 3/1995 | Fraley | |
| 5,471,824 A | 12/1995 | Neely | |
| 5,598,689 A | 2/1997 | Bork | |
| 5,692,572 A | 12/1997 | Cloney et al. | |

* cited by examiner

Primary Examiner—Robert E. Pezzuto
Assistant Examiner—Meredith Petravick
(74) Attorney, Agent, or Firm—Emch, Schaffer, Schaub & Porcello Co., L.P.A.

(57) ABSTRACT

The apparatus is a trimmer and mower deck combination comprising a trimmer resiliently positioned with respect to the mower deck for horizontal movement with respect to the mower deck. A resilient member holds the trimmer in an extended position away from the mower deck and allows the trimmer to move to a retracted position adjacent the mower deck when the trimmer meets a fixed obstacle. A drive for operating the trimmer is adapted to move with the trimmer. As a result, an operator may mow in a straight line and do the edging without interfering with the mower of the main deck.

2 Claims, 3 Drawing Sheets

MOWER DECK AND TRIMMER COMBINATION

TECHNICAL FIELD

This invention relates to a combination lawn trimmer and mowing deck.

BACKGROUND ART

Conventional lawn mowers, be they walk behind, lawn tractors and riders of all types, have long had the disadvantage of an inability to closely trim or edge around stationary objects such as trees, posts, buildings and the like. Commonly, the trimming and edging is accomplished by hand, using a string trimmer or trimming mower. Such hand edging is time consuming and physically demanding.

One solution to the problem is found in U.S. Pat. No. 5,396,754 which provides an articulated arm and trimmer for mounting on a tractor. However, the apparatus of the '754 patent is cumbersome and not easily adaptable to smaller mowers and lawn tractors. Thus, it is desirable to provide a mower deck having an edger in combination therewith which provides a capability of trimming around stationary objects such as fences, posts, trees, walls, guard rails and the like.

Particularly troublesome areas to mow are found in cemeteries. When mowing a cemetery, one has to mow around a multitude of permanent grave stones without damaging the stones. Typically, the job is completed with a string trimmer by hand. Stone placement and size differ from cemetery to cemetery. As a result, the width of mower cut may vary from 6 to 12 inches or more depending on the cemetery, thereby creating a lot of trimming labor.

A trim mower attachment for riding mowers is shown in U.S. Pat. No. 5,598,689, however, the trim attachment is fixed in place with respect to the horizontal cut of the mower deck and is hinged to move in the vertical plane to provide compensation for the changing contours of the mowing surface. The structure provided in the '689 patent is seriously deficient however in assisting the mower operator to closely trim around a large number of fixed obstacles such as cemetery stones and fence posts. In fact, the extent with which the trimmer is positioned outside the normal width of the mower deck forces the operator to exercise careful diligence when approaching stationary objects or risk damaging the mower.

The devices of the prior art, such as the '754 apparatus and the '689 apparatus, particularly lack the ability of the trimmer or edger to move horizontally outwardly or inwardly from the main mower deck to meet and trim around fixed obstacles in the cutting path. Accomplishing this trimming and edging ability while maintaining an even cut with respect to the terrain and not interfering with the operation of the main mower deck is highly desirable.

DISCLOSURE OF INVENTION

The invention is a trimmer for mower decks comprising a trimmer resiliently positioned with respect to the mower deck to have an overlapping cutting path to the cutting path of the mower deck. The preferred embodiment makes use of a trimmer pivotally connected to an arm fixed to the mower deck which allows for horizontal extension and retraction of the trimmer with respect to the mower deck. A resilient member maintains the trimmer in an extended position away from the mower deck and allows the trimmer to move to a retracted position adjacent the mower deck when it contacts a fixed obstacle and return to its extended position after the obstacle has passed. A drive for operating the trimmer is adapted to move with the trimmer. In a preferred embodiment, the trimmer includes a second resilient member pivotally connected between the arm and the trimmer which stabilizes the relative horizontal movement between the mower deck and the trimmer.

As a result, an operator may mow in a straight line and trim around stationary obstacles without interfering with the operation of the mower deck.

DETAILED DESCRIPTION OF THE INVENTION

Figure 1:
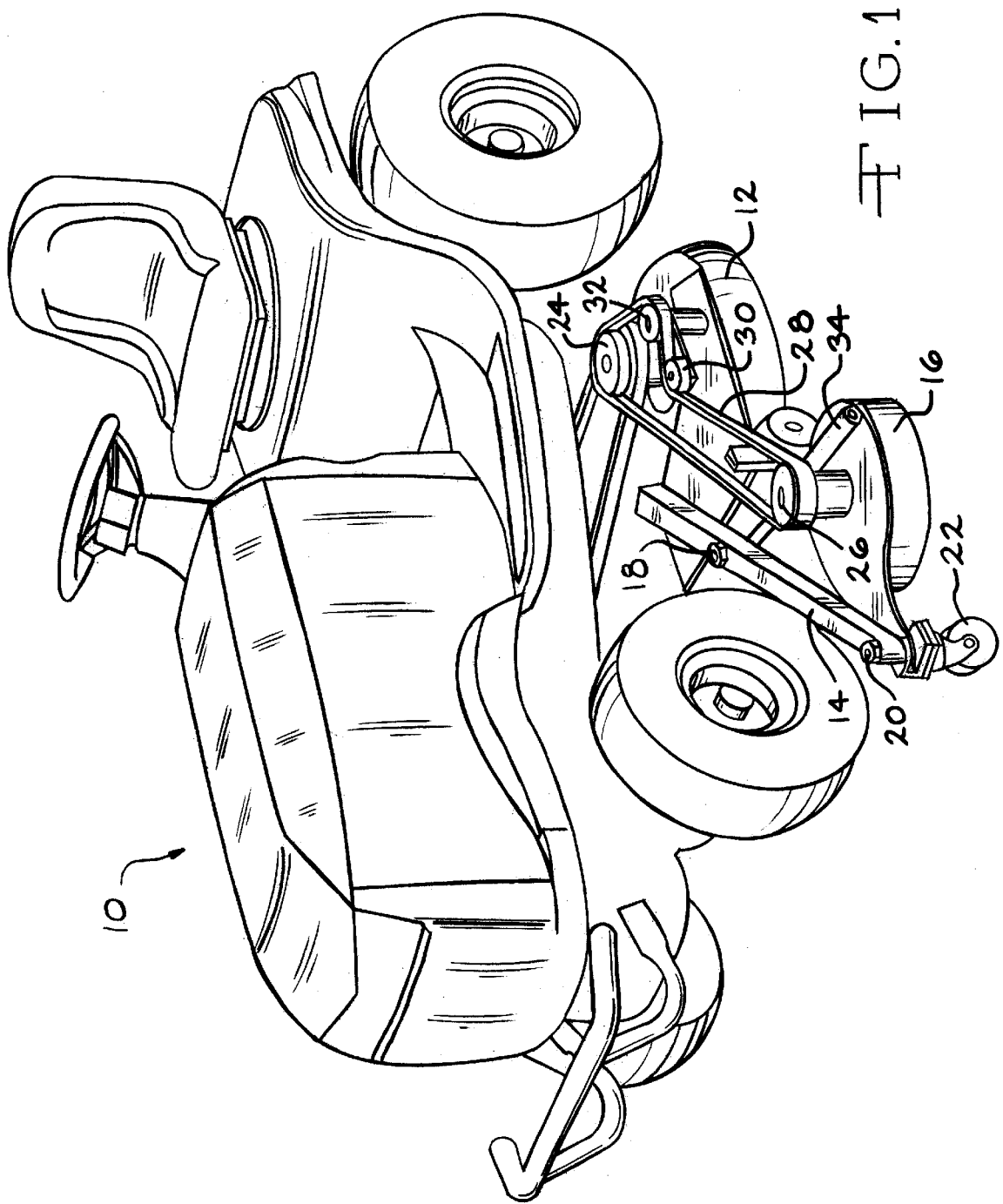
FIG. 1 is a perspective view showing the mowing deck and trimmer combination of the present invention as incorporated with a riding mower.

In the preferred embodiment, the trimmer is positioned off one side of the mower deck and its cutting blades are aligned with the blades of the mower deck to overlap cutting swaths. The structure of the trimming head may variously be an integral part of the mower deck, a separate trimming head, or a combination of multiple smaller heads. The crux of the invention lies in the ability of the trimming head to resiliently retract when it meets an immovable object and then extend to its original position after the object has passed. As the mower approaches an obstruction, the leading edge of the trimmer will make contact with the obstruction and a rub bar located on the front of the trimmer will push the trimmer in towards the mower deck. The trimmer will edge and trim the grass following around the obstruction from the front to the side and back in on the other side of the obstruction with the aid of a resilient tensioner. The trimmer may have a optional manual control to retract it back toward the mower deck for any purpose. The trimmer is mounted with respect to the deck for horizontal movement. In another embodiment, the trimmer can be adapted for vertical movement so that the trimmer will follow the contour of the mowing surface and flex vertically as it moves horizontally. The trimmer may be of a design to fold up to allow the mower deck to fit through narrow areas and also to be adapted with a simple mount for easy removal.

It is of importance that the invention is generally directed toward a resiliently retractable attachment that cuts a swath of grass overlapping the cutting path of the main mower deck. This objective can be accomplished by a variety of structures. For instance, the trimmer may be attached to the frame of the mower rather than the deck. However, for the purposes of simplicity in explaining the invention, the following description of the preferred embodiment describes the invention structure as having the trimmer resiliently attached to the mower deck.

In the preferred embodiment, the trimmer head is mounted on an arm which is fixed to the mower deck. The arm may be rigid or have a flex joint depending upon the design. The trimmer can be driven by belts, hydraulic, electrical, air, gas or diesel, flex cable, shaft, or any other power source. The trimming member may be a metal blade, rubber blade, plastic blade, line, or any material or combination of known material which will cut grass. The frame can be made out of metal, but the leading edges preferably have a plastic rubber rub bar along the edge so as to not damage the stationary obstacles. The mower deck also may be constructed from any other material that will meet the demand. The housing of the trimmer also may be designed so the cut grass is thrown clear of the mower deck, towards the main mower deck so as to spread the grass, or to mulch the cut grass.

The arm may have some flex so as to allow the trimmer head to follow the contour of the surface. Adjustable runners, wheels, rollers, castors, or air float maintains the trimmer head height in line with the mower deck to provide an even cut of the mower surface.

While it is envisioned that the trimming head and mowing deck combination of this invention may be utilized with tractors, lawn tractors, push mowers, and mowers of all designs and sizes, for the purposes of simplicity in description, the invention will be described as used with a mid-mounted lawn tractor.

FIG. 1 shows a conventional tractor 10 with a mower deck 12 attached thereto. Arm 14 connects the trimmer head 16 to the mower deck 12. The arm 14 is bolted 18 to the mower deck 12 to allow for easy removal. A pivot mechanism or connector 20 connects the arm 14 to the trimmer 16. A wheel 22 is fixed to the arm 14 to provide horizontal stability for the trimmer 16. The trimmer 16 is driven by a belt 28 which in turn is driven by drive pulley 24 and trimmer pulley 26. Belt 28 tension is maintained by the idler pulleys 30 and 32 which allow the belt 28 to move inwardly and outwardly to compensate for the movement of the trimmer 16. Resilient arm 34 engages the arm 14 and the trimmer 16 through a second pivot connector 36 to assist in providing horizontal stability to the trimmer.

Figure 2:
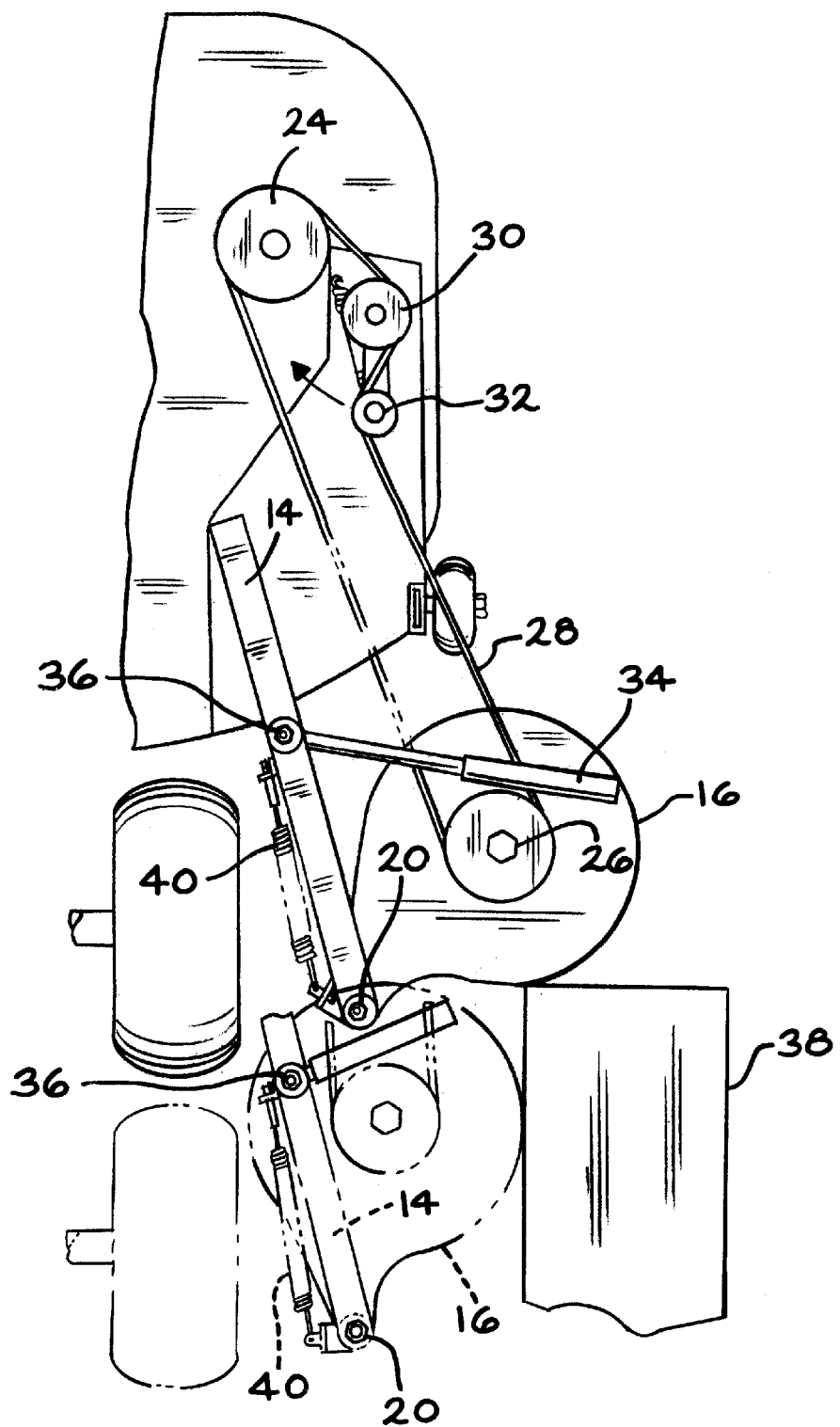
FIG. 2 is a top view, partially broken away, showing the trimmer in its extended position and a retracted position abutting a stationary object.

FIG. 2 shows the trimmer 16 in an extended and retracted position as it passes an obstruction 38. The tension spring 40 is fixed to the trimmer 16 to continually motivate the trimmer 16 into the extended position. The tension spring 40 may also be a telescoping hydraulic or pneumatic cylinder.

Figure 3:
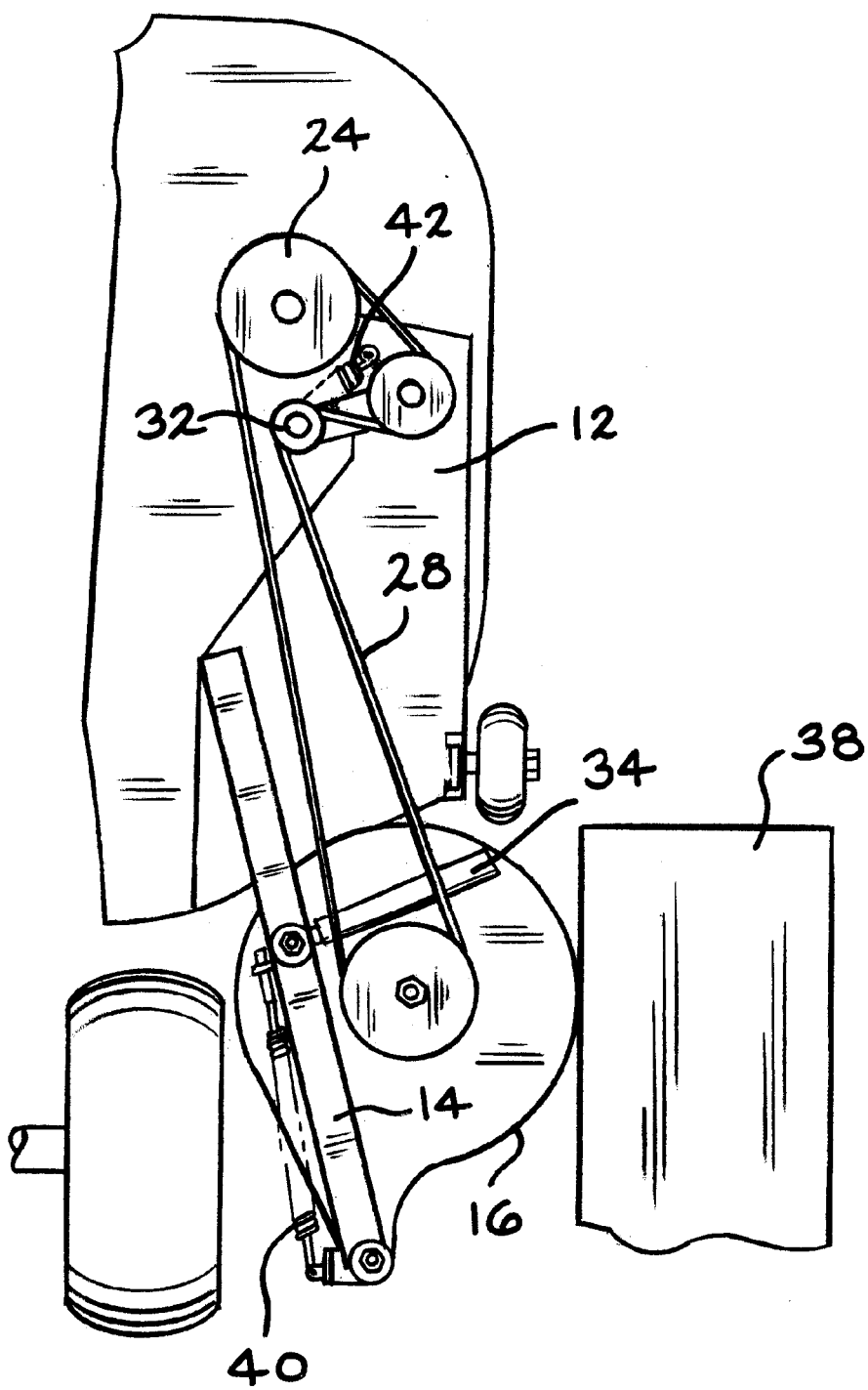
FIG. 3 is a top view showing the trimmer in its retracted position.

FIG. 3 shows the trimmer 16 in a retracted position against the obstruction 38. The tension spring 40 is in a compacted position and resilient arm 34 is in a closed telescoped position. Idler pulley 32 is located in a takeup position tensioned by spring 42, thereby taking up the slack of belt 28 to accommodate the inward movement of the trimmer 16.

After the mower 10 and trimmer 16 pass the obstruction 38, the tension spring 40 and the resilient arm extend the trimmer 16 away from the mower deck and around the back edge of the obstacle 38. Thus, trimming and edging around the obstacle is accomplished while the mower deck is moving along a straight path.

This description of the invention as presented herein is intended to be illustrative in nature and not necessarily limiting upon the scope and content of the following claims.

The alternative structures disclosed and discussed herein, as well as any other structures which may provide an equivalent function are fully intended to be included in the scope and content of the following claims.

I claim:

1. A mower deck and trimmer combination for use in mowing and trimming around fixed obstacles comprising:
    a mower deck;
    a trimmer engaged with the mower deck and oriented to one side and forward of the mower deck such that the cutting paths of the trimmer and the mower deck overlap;
    a pivot member engaging the trimmer with the mower deck, the pivot member defining a pivot axis normal to the cutting plane of the mower deck, the pivot axis being in a fixed position forward and to one side relative to the mower deck, wherein the trimmer moves on a horizontal plane about the pivot axis when encountering such obstacles;
    a stabilizer arm engaged between the trimmer and the mower deck to provide vertical stabilization of the trimmer with respect to the mower deck; and
    drive means for supplying power to the trimmer and the mower deck.

2. The combination of claim 1 wherein the stabilizer arm is connected to and extends from the mower deck to a distal location to one side and forward of the mower deck, and the pivot member is fixed to the distal end of the stabilizer arm.

* * * * *